(12) United States Patent
Binder et al.

(10) Patent No.: US 11,906,126 B2
(45) Date of Patent: Feb. 20, 2024

(54) ILLUMINATION APPARATUS FOR A MOTOR VEHICLE

(71) Applicant: Bayerische Motoren Werke Aktiengesellschaft, Munich (DE)

(72) Inventors: Thomas Binder, Munich (DE); Sebastien Casenave, Munich (DE); Dominik Hart, Riemerling (DE); Katharina Santner, Munich (DE); Chunyue Zhai, Gauting (DE)

(73) Assignee: B ayerische M otoren W erke A ktiengesellschaft, Munich (DE)

( * ) Notice: Subject to any disclaimer, the term of this patent is extended or adjusted under 35 U.S.C. 154(b) by 0 days.

(21) Appl. No.: 17/792,173

(22) PCT Filed: Mar. 15, 2021

(86) PCT No.: PCT/EP2021/056442
§ 371 (c)(1),
(2) Date: Jul. 12, 2022

(87) PCT Pub. No.: WO2021/190962
PCT Pub. Date: Sep. 30, 2021

(65) Prior Publication Data
US 2023/0049205 A1    Feb. 16, 2023

(30) Foreign Application Priority Data
Mar. 24, 2020    (DE) .................... 10 2020 108 010.7

(51) Int. Cl.
*F21S 43/14*    (2018.01)
*F21S 43/33*    (2018.01)
*F21S 43/31*    (2018.01)

(52) U.S. Cl.
CPC .............. *F21S 43/14* (2018.01); *F21S 43/31* (2018.01); *F21S 43/33* (2018.01)

(58) Field of Classification Search
CPC ..................... B60Q 2400/20; F21S 43/14–20
See application file for complete search history.

(56) References Cited

U.S. PATENT DOCUMENTS 5,975,723 A * 11/1999 Daumueller ............. B60Q 1/26
362/519
6,811,277 B2 * 11/2004 Amano ................. F21S 43/247
362/346

(Continued)

FOREIGN PATENT DOCUMENTS

CN    107401715 A    11/2017
DE    2 147 371 A    3/1972
(Continued)

OTHER PUBLICATIONS

International Search Report (PCT/ISA/210) issued in PCT Application No. PCT/EP2021/056442 dated Jun. 14, 2021 with English translation (six (6) pages).

(Continued)

*Primary Examiner* — Jason M Han
(74) *Attorney, Agent, or Firm* — Crowell & Moring LLP

(57) ABSTRACT

An illumination apparatus for a motor vehicle includes a lighting device having one or more light sources, a reflector arrangement having one or more scatter reflectors, and one or more transparent bodies each having a surface made of a plurality of flat facets. The illumination apparatus is designed such that light generated by the light source(s) of the lighting device is scattered at the scatter reflector(s) of the reflector arrangement, as a result of which scattered light is created, which is refracted at least partially on facets of the transparent body or bodies and then exits the illumination apparatus in order to generate a light distribution.

17 Claims, 1 Drawing Sheet

(56) References Cited

U.S. PATENT DOCUMENTS

| | | | |
|---|---|---|---|
| 10,451,239 B2 * | 10/2019 | Suwa | ............... B60Q 1/04 |
| 2009/0027911 A1 | 1/2009 | Misawa et al. | |
| 2012/0163031 A1 | 6/2012 | Okada et al. | |
| 2017/0198877 A1 | 7/2017 | Suwa et al. | |
| 2017/0219179 A1 | 8/2017 | Hirata et al. | |
| 2017/0336042 A1 | 11/2017 | Laminette et al. | |

FOREIGN PATENT DOCUMENTS

| | | |
|---|---|---|
| DE | 694 03 404 T2 | 9/1997 |
| DE | 10 2009 052 321 A1 | 5/2011 |
| DE | 10 2010 054 923 A1 | 6/2012 |
| DE | 10 2011 119 859 A1 | 6/2012 |
| EP | 2 161 494 A1 | 3/2010 |
| FR | 3 007 821 A1 | 1/2015 |
| FR | 3 025 286 A1 | 3/2016 |
| FR | 3 075 311 A1 | 6/2019 |
| WO | WO 2014/106599 A1 | 7/2014 |
| WO | WO 2016/051491 A1 | 4/2016 |
| WO | WO 2019/122612 A1 | 6/2019 |

OTHER PUBLICATIONS

German-language Written Opinion (PCT/ISA/237) issued in PCT Application No. PCT/EP2021/056442 dated Jun. 2, 2021 (six (6) pages).

German-language Search Report issued in German Application No. 10 2020 108 010.7 dated Nov. 11, 2020 with English translation (12 pages).

English translation of Chinese Office Action issued in Chinese Application No. 202180007351.3 dated Oct. 7, 2023 (7 pages).

\* cited by examiner

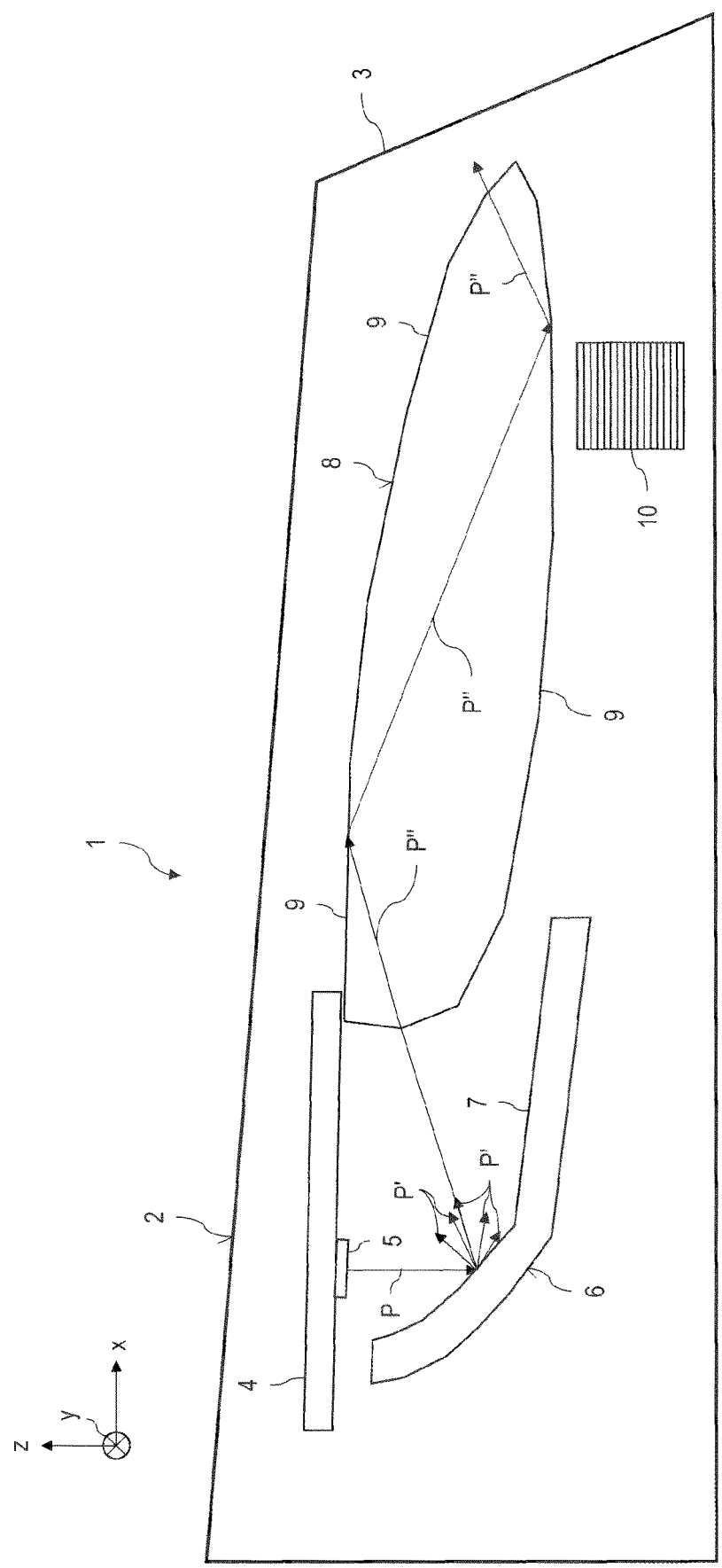

ILLUMINATION APPARATUS FOR A MOTOR VEHICLE

BACKGROUND AND SUMMARY OF THE INVENTION

The invention relates to an illumination apparatus for a motor vehicle and a corresponding motor vehicle.

Illumination apparatuses for motor vehicles are known from the prior art, in which the light of LEDs or laser diodes is deflected in a directed manner via a reflector to generate a predetermined light distribution in the surroundings of the motor vehicle. Furthermore, there are vehicle lights which emit the light of LEDs directly, so that multiple light spots are recognizable to an observer. A large number of LEDs is required for such vehicle lights to generate a planar light distribution.

The object of the invention is to create an illumination apparatus for a motor vehicle which generates a light distribution efficiently.

This object is achieved by the illumination apparatus according to the claimed invention.

The illumination apparatus according to an embodiment of the invention is provided for a motor vehicle, wherein the motor vehicle is preferably a passenger vehicle, but can possibly also be a truck or motorcycle. When interactions between the illumination apparatus and the motor vehicle are described hereinafter and in particular in the claims, this is always to be understood in such a way that the interaction occurs upon arrangement or installation of the illumination apparatus in the motor vehicle. The components of the illumination apparatus which have a corresponding interaction with the motor vehicle or parts of the motor vehicle are therefore designed in such a way that the interaction is induced upon arrangement or installation of the illumination apparatus in the motor vehicle.

The illumination apparatus according to an embodiment of the invention is preferably a signal light for emitting light into the exterior of the motor vehicle, i.e., it is used for signaling in the surroundings of the motor vehicle and not for actively illuminating the surroundings, as is the case with a headlight. The illumination apparatus according to the invention can optionally also be an interior light for a motor vehicle.

The illumination apparatus according to an embodiment of the invention comprises a lighting device, which has one or more light sources, a reflector arrangement, which has one or more scattering reflectors, and one or more transparent bodies which each have a surface made up of a plurality of planar and preferably ground facets, wherein preferably the entire surface of a respective transparent body is formed from facets. A transparent body is to be understood here as a body which is formed from a material having a transmittance of 90% or more and in particular of 95% or more.

The illumination apparatus according to an embodiment of the invention is designed in such a way that light which is generated by the light source or the light sources of the lighting device is scattered on the scattering reflector or the scattering reflectors of the reflector arrangement, due to which scattered light results, which is at least partially refracted on facets of the transparent body or the transparent bodies and subsequently exits from the illumination apparatus to generate a light distribution. Light is to be understood as electromagnetic waves in the visible spectral range.

The illumination apparatus according to an embodiment of the invention is distinguished by the combination of one or more scattering reflectors with one or more transparent bodies made of planar facets, which enables the generation of a planar light distribution. In particular, due to the light scattering and subsequent refraction, individual light sources are no longer visible, so that few light sources and possibly also a single light source are already sufficient to generate the planar light distribution.

The scattering reflectors used in the illumination apparatus according to an embodiment of the invention can be implemented in various ways. It is solely decisive that a deflection of the light beams in a plurality of directions is effectuated at the reflection surface of a respective scattering reflector designed as a scattering surface, which can be achieved, for example, by way of irregularly arranged reflection elements on the scattering surface, for example, irregularly arranged facets.

In one preferred embodiment, at least one light source and possibly also each light source of the lighting device is a polychromatic light source and in particular a white light source, the light of which is spectrally decomposed by way of light refraction at facets of at least one transparent body of the provided transparent bodies and subsequently exits from the illumination apparatus. A visually appealing light distribution having a rainbow effect is generated in this way.

The transparent bodies installed in the illumination apparatus can be designed differently. In one variant, at least one transparent body and possibly also each transparent body is formed from glass and preferably from crystal glass. Alternatively or additionally, at least one transparent body and possibly also each transparent body can be formed from plastic.

In a further embodiment of the illumination apparatus according to the invention, each light source of the lighting device is associated with a separate scattering reflector, at which exclusively light of the associated light source is scattered.

The shape of a respective scattering reflector of the reflector arrangement can be designed differently. In one preferred variant, a respective scattering reflector has a scattering surface which is curved at least in sections, by which a compact structure of the illumination apparatus is enabled.

In one preferred embodiment, the main beam direction (i.e., the direction having the highest light intensity) of the light source or the light sources of the lighting device, upon installation of the illumination apparatus in the motor vehicle, extends essentially in the vertical direction, preferably in the vertical direction downward, but possibly also upward. The light of the light source or light sources is deflected via the reflector arrangement toward the transparent body or the transparent bodies which are in turn positioned in the horizontal direction adjacent to the light source or the light sources. Based on this beam deflection, it is possible that an observer cannot look directly at the light sources, which is undesirable in particular in the case of high powers of the light sources.

In a further, particularly preferred embodiment, a respective light source of the lighting device is an essentially punctiform light source. Preferably, a respective punctiform light source is an LED unit made up of one or more LEDs (for example an RGB LED unit) or a laser light source made up of one or more laser diodes (for example an RGB laser light source). If the LED unit or the laser light source contains multiple LEDs or laser diodes, these are arranged sufficiently close to one another that the punctiform nature of the light source is still provided.

In a further embodiment, the lighting device of the illumination apparatus is operable in one or more operating modes, wherein light for a light function is provided in a respective operating mode which is associated with the respective operating mode. The light function does not necessarily have to be implemented exclusively by the light of the lighting device. At least one further lighting device can also optionally be provided, which provides light for the corresponding light function.

In one preferred variant of the above-described embodiment, the operating mode or the operating modes comprise one or more of the following operating modes:
- an operating mode for providing a flashing light as a light function;
- an operating mode for providing a daytime running light as a light function;
- an operating mode for providing a position light as a light function;
- an operating mode for providing a light production before startup or after shutdown of the motor vehicle.

The last-mentioned operating mode can be coupled to various events. For example, the light production can be begun when an approach of a user to the motor vehicle is detected. The light production can also be triggered in that the motor vehicle is unlocked or locked by a user.

In a further preferred embodiment, the lighting device comprises one or more light groups each made up of one or more light sources, wherein the light source or the light sources of one light group each emit light having the same color and the light sources from various groups emit light having different colors. A color can also be a mixture made up of multiple spectral colors here, which is the case for white light, for example. This variant of the invention is preferably combined with the above-described embodiment, which relates to the operation of the lighting device in various operating modes. One light group is assigned to each operating mode here, wherein exclusively the light source or the light sources of the assigned light group are switched on in the respective operating mode. For example, one light group can consist of one or more light sources having yellow light color, which are switched on to implement a flashing light, whereas another light group consists of white light sources, which are activated, for example, to provide a daytime running light or position light.

In a further embodiment of the illumination apparatus according to the invention, the lighting device, the reflector arrangement, and the one or more transparent bodies are housed in a common housing which has a transparent pane for the light exit. In this way, an illumination module is formed by the illumination apparatus, which can be installed flexibly at various points in the motor vehicle.

As already mentioned above, in the illumination apparatus according to an embodiment of the invention, in addition to the lighting device made up of one or more light sources, at least one further lighting device can also be installed, which is used, for example, in addition to implement a corresponding light function. In one embodiment, a further lighting device in the form of a light guide is provided, from which light of a corresponding light source is decoupled, for example, for a daytime running light.

In a further preferred embodiment, the illumination apparatus according to the invention is configured to be installed in the vertical direction above a vehicle headlight. The illumination apparatus thus represents a suitable supplement to the headlight light (i.e., low beams and high beams) and can provide, for example, the light function of the flashing light and/or daytime running light and/or position light.

The invention additionally comprises a motor vehicle which comprises one or more of the illumination apparatuses according to embodiment of the invention.

An exemplary embodiment of the invention is described in detail hereinafter on the basis of appended FIG. 1.

BRIEF DESCRIPTION OF THE DRAWING

FIG. 1 shows a schematic section through a variant of an illumination apparatus according to the invention.

DETAILED DESCRIPTION OF THE DRAWING

FIG. 1 shows in section an illumination apparatus in the form of a vehicle signal light 1. The vehicle signal light is installed here above a front headlight (not shown) of a motor vehicle. According to the coordinate system shown in FIG. 1, the x direction represents the travel direction in which the motor vehicle moves forward as it drives straight ahead. This direction extends along the longitudinal axis of the motor vehicle. In relation thereto, the y direction is the transverse direction of the motor vehicle and the z direction is the vertical direction or height direction.

The vehicle signal light 1 is enclosed by a schematically shown housing 2, which is delimited on the front side by a transparent cover pane 3. A printed circuit board 4, on which a plurality of LEDs 5 is arranged, is located inside the housing. Only a single LED is apparent from the sectional illustration of FIG. 1. The LEDs 5 are arranged adjacent to one another in the y direction, wherein a white light LED alternates with a yellow LED. The white light LEDs are used to generate daytime running light, while the yellow LEDs implement a flashing light, as described in more detail hereinafter. For example, 10 or more white light LEDs and a corresponding number of yellow LEDs can be provided.

The respective LEDs 5 emit in the vertical direction downward, as indicated by the arrow P. The light of the LEDs is incident on a scattering reflector 6. In the embodiment described here, a single continuous scattering reflector is provided, which extends in the y direction below the LEDs and has a curved cross section. It is optionally also possible that a separate scattering reflector is provided below each LED. The scattering reflector 6 has a reflection surface 7 formed as a scattering surface. This scattering surface causes the scattering of light incident thereon. The scattering surface can be implemented differently depending on the design. For example, the scattering surface can be formed by an irregular arrangement of facets. The light scattering generated by the scattering surface is indicated by way of example by multiple arrows P' pointing in different directions. Furthermore, a beam course of a light beam after its scattering is shown by way of example by arrows P'''.

The light scattered on the curved scattering surface 7 enters a transparent crystal glass body 8, the entire surface of which is formed from a plurality of ground facets 9, wherein only a part of the facets is provided with this reference sign for reasons of clarity. The crystal glass body 8 extends in the y direction along the entire arrangement of LEDs 5. The light entering the crystal glass body 8 is reflected and refracted therein, as indicated by the arrows P'''. A part of the light conducted through the crystal glass body radiates outward via the cover pane 3. Multiple crystal glass bodies can optionally also be arranged adjacent to one another in the y direction, wherein the light of a subset of the LEDs 5 is incident in each crystal glass body. For example, four separate crystal glass bodies can be positioned adjacent to one another in the y direction, wherein the light of multiple yellow LEDs and multiple white LEDs is radiated into each crystal glass body.

In the embodiment of FIG. 1, a light guide 10 shown in section is furthermore installed as an additional lighting device adjacent to the LEDs 5 in the vehicle signal light 1. This light guide extends in the y direction. The light radiated into the light guide in the y direction is decoupled from the light guide in the x direction and radiates outward via the cover pane 3. A part of the daytime running light function of the vehicle signal light 1 is implemented by the light guide 10.

The LEDs 5 of the vehicle signal light 1 can be used both to provide a flashing light and also to provide a part of the daytime running light. Only the yellow LEDs are switched on and off at a predetermined frequency for the flashing light. The yellow light of the LEDs reaches, via the scattering reflector 6, the crystal glass body 8, which then begins to sparkle in the yellow color due to the ground facets 9. A visually appealing flashing signal is generated in this way.

In contrast, if a part of the daytime running light function is implemented by the LEDs, exclusively the white light LEDs are switched on. The white light reflected on the scattering reflector 6 again enters the crystal glass body 8, wherein the ground facets 9 cause a spectral decomposition of the white light, so that an appealing light distribution having rainbow effect is generated by the crystal glass body. Upon activation of the daytime running light function, light is furthermore fed into the light guide 10, so that the daytime running light also comprises the lighted light guide 10.

The daytime running light function can be used simultaneously with the flashing light. In this case, exclusively the light guide 10 is used to generate the daytime running light, whereas the flashing light is implemented by the yellow LEDs. After the flashing light is switched off, the white light LEDs can then be used to supplement the daytime running light.

The embodiment described above has an array of advantages. In particular, a vehicle signal light is provided, which is constructed compactly and enables the generation of various light functions using one or more punctiform light sources. The corresponding light function is implemented in a visually appealing manner due to the use of one or more scattering reflectors and one or more transparent bodies having ground facets.

LIST OF REFERENCE SIGNS 1 illumination apparatus
2 housing
3 transparent pane
4 printed circuit board
5 LED
6 scattering reflector
7 scattering surface
8 transparent crystal glass body
9 facets
10 light guide
P, P', P" arrows
x, y, z coordinates

What is claimed is:

1. An illumination apparatus for a motor vehicle, the illumination apparatus comprising:
   a lighting device which has one or more light sources,
   a reflector arrangement which has one or more scattering reflectors, and
   one or more transparent bodies, each of which has a surface made up of a plurality of planar facets,
   wherein the illumination apparatus is configured such that light which is generated by the one or more light sources of the lighting device is scattered on the one or more scattering reflectors of the reflector arrangement, resulting in scattered light which is at least partially refracted at a first facet of the one or more transparent bodies upon entering the one or more transparent bodies, is subsequently reflected by at least one second facet of the one or more transparent bodies, and subsequently exits from the illumination apparatus to generate a light distribution, and
   wherein at least one scattering reflector of the one or more scattering reflectors comprises a plurality of irregularly arranged reflection elements.

2. The illumination apparatus according to claim 1, wherein at least one light source of the one or more light sources is a polychromatic light source, the light of which is spectrally decomposed by way of light refraction at the first facet of the one or more transparent bodies.

3. The illumination apparatus according to claim 1, wherein at least one transparent body of the one or more transparent bodies is formed from glass and/or at least another transparent body of the one or more transparent bodies is formed from plastic.

4. The illumination apparatus according to claim 3, wherein the glass is crystal glass.

5. The illumination apparatus according to claim 1, wherein each light source of the one or more light sources is assigned to a separate scattering reflector of the one or more scattering reflectors on which exclusively light of the assigned light source is scattered.

6. The illumination apparatus according to claim 1, wherein a respective scattering reflector of the one or more scattering reflectors has a scattering surface which is curved at least in sections.

7. The illumination apparatus according to claim 1, wherein:
   a main beam direction of the one or more light sources of the lighting device extends essentially in a vertical direction upon installation of the illumination apparatus in the motor vehicle, and
   the light of the one or more light sources is deflected via the reflector arrangement toward the one or more transparent bodies, which are positioned in a horizontal direction adjacent to the one or more light sources.

8. The illumination apparatus according to claim 1, wherein a respective light source of the one or more light sources is an essentially punctiform light source.

9. The illumination apparatus according to claim 8, wherein the respective light source is an LED unit made up of one or more LEDs or a laser light source made up of one or more laser diodes.

10. The illumination apparatus according to claim 1, wherein:
    the lighting device is operable in one or more operating modes, and
    in a respective operating mode, light is provided for a light function which is assigned to the respective operating mode.

11. The illumination apparatus according to claim 10, wherein the one or more operating modes comprise at least one of the following:
    a first operating mode for providing a flashing light as the light function;

a second operating mode for providing a daytime running light as the light function;

a third operating mode for providing a position light as the light function; or a fourth operating mode for providing a light production before startup or after shutdown of the motor vehicle.

12. The illumination apparatus according to claim 1, wherein:

the lighting device comprises one or more light groups each made up of at least one of the one or more light sources, and the at least one of the one or more light sources of one light group each emit light having a same color and other light sources from different groups emit light having different colors.

13. The illumination apparatus according to claim 12, wherein:

the lighting device is operable in one or more operating modes, in a respective operating mode, light is provided for a light function which is assigned to the respective operating mode, and one light group is assigned to each operating mode and exclusively one or more light sources of the assigned light group are switched on in the respective operating mode.

14. The illumination apparatus according to claim 1, wherin the lighting device, the reflector arrangement, and the one or more transparent bodies are housed in a common housing, which has a transparent pane for light exit.

15. The illumination apparatus according to claim 1, further comprising an additional lighting device.

16. The illumination apparatus according to claim 1, wherein the illumination apparatus is configured to be installed in a vertical direction above a vehicle headlight.

17. A motor vehicle comprising the illumination apparatus according to claim 1.

* * * * *